Figure 1:
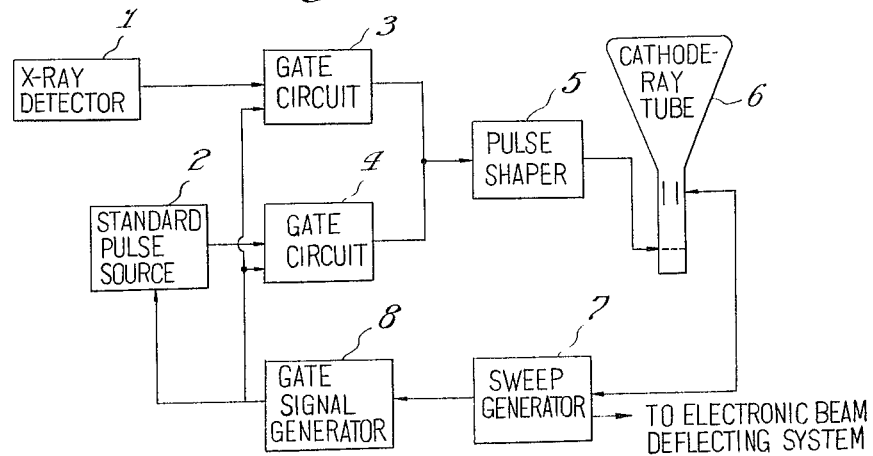

Sept. 20, 1966  HIROSHI TOMITA  3,274,385

SCANNING X-RAY MICROANALYSER

Filed Feb. 18, 1963

United States Patent Office 3,274,385
Patented Sept. 20, 1966

3,274,385
SCANNING X-RAY MICROANALYSER
Hiroshi Tomita, Iwata-shi, Japan, assignor to Kabushiki Kaisha Hitachi Seisakusho, Tokyo, Japan, a joint-stock company of Japan
Filed Feb. 18, 1963, Ser. No. 259,211
Claims priority, application Japan, Feb. 23, 1962, 37/6,436
4 Claims. (Cl. 250—49.5)

This invention relates to an improvement of a ssytem indicating the distribution of concentration of an element in a scanning X-ray microanalyser.

In general, a scanning X-ray microanalyser operates in such a manner that a two-dimensional distribution of a certain element on the face of a specimen is indicated by the brightness and darkness of a scanning X-ray image produced on a fluorescent screen of a cathode-ray tube (Braun tube). By this system, however, it has not been possible, heretofore, to accomplish quantitative analysis of distribution of concentration.

Heretofore, a quantitative measurement of the distribution of concentration of an element has been made by a method comprising slowly scanning and irradiating by means of an electron probe along any straight line on the face of a specimen, measuring by means of a detector only the X-rays corresponding to a specific element among the X-rays emitted by the said bombardment of the electron beam from the face of the specimen, and recording the change of counting rate of the output pulses from the said detector to determine the distribution of concentration of the specific element along the said straight line. This method, however, has the disadvantage of being capable of indicating only the distribution of concentration along a line.

If a correspondence can be established between the counting rate of input pulses which control the brightness of the cathode-ray tube and the brightness of the fluorescent screen of the cathode-ray tube produced thereby, the counting rate of X-rays emitted produced at each part of the specimen can be determined from the brightness of any part on the scanning X-ray image corresponding to the said part of the specimen, and quantitative measurement of distribution of concentration of the element can be made by two dimensional indication. However, since the brightness of the fluorescent screen of cathode-ray tubes differs according different cathode-ray tubes, although their counting rates of input pulses controlling the brightness are the same, and since even with the same cathode-ray tube, the said brightness differs with the beam potential, beam current, or the pulse shape of input pulse controlling the brightness, it is not at all simple to establish the above-stated correspondence. Moreover, in the case of photographic recording, it is necessary to maintain constant exposure-time and conditions of the developing process. This point also gives rise to technical difficulty.

This invention contemplates making feasible, by solving the abovementioned difficulties, the quantitative determination of the counting rate of input pulses controlling the brightness, that is, the counting rate of output pulses of the detector, readily from measurement of brightness.

The nature, principle, and details of the invention will be more clearly apparent by reference to the following description, taken in conjunction with the accompanying drawing which shows a preferred embodiment of the scanning X-ray microanalyser according to the invention, and in which:

FIGURE 1 is a block diagram of one example of an essential circuit; and

Figure 2:
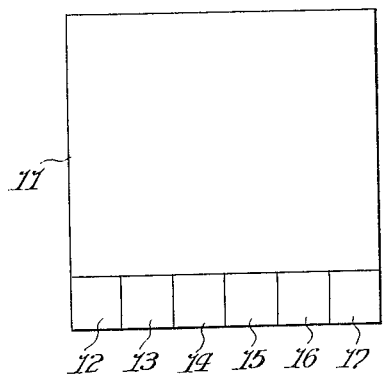

FIGURE 2 is a schematic diagram showing one example of images on the screen of a cathode-ray tube for indicating distribution of concentration of an element which is included in the specimen. Referring to FIGURE 1, reference numeral 1 designates an X-ray detector such as a scintillation counter or a proportional counter, 2 is a standard pulse source of variable counting rate, 3 and 4 are gate circuits, 5 is a pulse shaper such as a multivibrator, 6 is a cathode-ray tube, 7 is a sweep generator, and 8 is a gate signal generator. In such an arrangement signal pulses of an unknown counting rate from the X-ray detector 1 and standard pulses of a known counting rate from the standard pulse source 2 are switched over alternately by means of gate circuits 3 and 4 which are operated by gate signals synchronized to the scanning of the face of the specimen and of the screen of the cathode-ray tube 6 and passed through the same pulse shaper 5. Thereafter, these pulses are sent to a terminal for controlling the brightness of the cathode-ray tube 6 so as to produce on the same screen an X-ray scanning image of the specimen and a standard image of the brightness. By comparing the brightnesses of the two images, the counting rate at each part of the X-ray image of the specimen is determined, and, relative to the distribution of concentration of each specific element in the specimen, quantitative measuring results are obtained by two-dimensional indication.

FIGURE 2 shows one example of an image on the screen of the cathode-ray tube in the microanalyser of this invention having the compositional arrangement shown in FIGURE 1. Reference numeral 11 designates an X-ray image region of the specimen produced by signal pulses from detector 1, and reference numerals 12 through 17 designate a region of a standard brightness produced by standard pulses. Of these 12 through 16 designate a part indicating stepwise standard brightness produced by standard pulses the counting rate of which changes in a stepwise manner over a wide range, and 17 is a part indicating variable standard brightness the counting rate of which is varied continuously. The former is used for comparatively detecting an approximate counting rate, and the latter is for reading precise values. Such a stepwise arrangement of the region of standard brightness on the screen is available from the combination of the standard pulse source 2 and gate circuits 3 and 4 in FIGURE 1. Also since the shape and position of the region of standard brightness can be readily changed at will by proper adjustment of gate signals, the region can be placed in a state in which comparison of brightness is made the easiest.

In connection with FIGURE 2 of the drawings, the region 11 of the screen of a cathode ray rube 6 is the so-called X-ray image region of a specimen with its brightness modulated from the signal pulse of the X-ray detector 1, and adapted to form an image having a brightness corresponding to the counting rate (detected by the detector 1) of the X-ray coming from the micro-portion of the specimen which is scanned by an electron beam. The brightness of respective portions of this image determines the quantity of X-ray from corresponding microportions of the specimen, whereby the quantity of tne elements constituting various portions of the specimen can be determined. Since it is impossible to quantitatively determine the brightness of various portions of the X-ray image of the specimen formed on the screen it is made possible, according to this invention, by comparing said brightness with standard images 12 to 17, the brightness thereof being modulated by pulses of known counting rates. Thus, in order to determine the composition of the specimen from the quantity of X-ray coming from a micro-portion of the specimen by the determining the brightness of the corresponding portion of the X-ray image region of the specimen 11 it is necessary to provide a standard image for comparing brightness adjacent the portion of the X-ray image whose brightness is to be determined. To this end, the supply of the signal pulse from the detector 1 to the brightness modulating terminal of the tube 6 is interrupted for a time interval corresponding to the interval during which said brightness standard image is to be formed during the synchronous scanning signal from the sweep generator 7 which supplies the synchronous scanning signal to the tube 6 and to the deflection system for an electron beam impinging upon the sample, and a pulse of known counting rate is supplied to the brightness modulating terminal of the tube 6 from the standard pulse source 2 instead of the signal pulse during said interval during which said signal pulse is being interrupted. For this purpose gate circuits 3 and 4 are provided to be alternately operated by the gate signal from the gate signal generator 8 in synchronism with the synchronous scanning signal. As a result, it is possible to produce the brightness standard image at any desired position by suitably adjusting the time relation between the gate signal and the scanning signal, whereby the brightness of any desired portion of the X-ray image of the specimen can be readily determined.

When the brightness of any portion of the X-ray image of the specimen and that of the brightness standard image are found equal upon comparison it can be determined that counting rate of the portion of the signal pulse corresponding to said portion of the X-ray image of the specimen is equal to the counting rate of the standard pulse corresponding to the portion of the standard image. This counting rate determines the quantity of X-ray from the corresponding portion of the specimen, which in turn determines the element constituting said portion.

Thus, it will be clear that, in order to provide brightness standard images at position 12 to 17 of FIGURE 2, it is necessary to close the gate circuit 3 for an interval corresponding to said portion to prevent the signal pulse from the detector 1 from being supplied to the brightness modulating terminal and to open the gate circuit 4 to supply the pulse of known counting rate from the standard pulse source 2 to the brightness modulating terminal. In this case if the counting rate of the standard pulse were varied stepwise corresponding to the respective portions of the brightness standard images 12 to 16 there would be obtained a plurality of brightness standard images 12, 13, 14, 15 and 16 whose brightness will vary in stepwise relation. Further if the counting rate of the standard pulse supplied to the brightness standard image 17 were varied continuously there would be provided a brightness standard image whose brightness varies continuously, thus insuring more accurate comparison of brightness.

As stated above, the brightness standard image is formed by interrupting a portion of the signal pulse corresponding to the portion of the X-ray image of the specimen, the brightness of which is to be modulated by said signal pulse from the detector 1 and supplying the standard pulse of known counting pulse to the brightness modulating terminal instead of the signal pulse so that the circuit of the gate signal is constructed such that the gate 3 is closed concurrently with the opening of the gate 4 and vice versa. By adjusting the time difference of the gate signal with respect to the synchronous scanning signal, one is able to vary the position of the brightness standard image. Similarly, the size and shape of the brightness standard image can be varied as desired by varying the pulse width of the gate signal, this is believed to be readily understood by those skilled in television art.

By the microanalyser of this invention of the above-described arrangement, various conditions relating to the aforementioned beam voltage, beam current or input pulse shape are automatically maintained in the same state with respect to both the region of X-ray image of the specimen and the region of standard brightness which is simultaneously imaged on the same screen, and it is possible to measure accurately and quantitatively the two dimensional distribution of concentration of an element within a specimen under analysis, without giving rise to problems due to the difference in the conditions of photography and subsequent treatment, because the standard image of brightness in the aforesaid same condition is imaged on the same screen with the X-ray image of the specimen.

Although this invention has been described with respect to a particular embodiment thereof, it is not to be so limited as changes and modifications may be made therein which are within the full intended scope of the invention, as defined by the appended claims.

What is claimed is:

1. A scanning X-ray microanalyser comprising a cathode-ray tube for producing scanned X-ray image in a first part of the screen of said cathode ray tube, means for producing standard pulses of predetermined counting rate, and means for creating, in a second part of the screen of said cathode-ray tube, at least, one image with standard brightness for comparison with the brightness of the scanned X-ray image, said image being created in response to said standard pulses.

2. A scanning X-ray microanalyser comprising a cathode-ray tube for producing scanned X-ray images in a first part of the screen of said cathode ray tube, means for producing standard pulses of predetermined counting rates which respectively differ in a stepwise manner, and means for creating, in a second part of the screen of said cathode-ray tube, a plurality of images with standard brightnesses which respectively differ in a stepped relation for comparison with the brightness of the scanned X-ray image, said images with standard brightness being created in response to said standard pulses.

3. A scanning X-ray microanalyser comprising a cathode-ray tube for producing scanned X-ray images in a first part of the screen of said cathode ray tube, means for producing standard pulses of a predetermined counting rate which varies continuously, and means for creating, in a second part of the screen of said cathode-ray tube, an image with standard brightness which varies continuously for comparison with the brightness of the scanned X-ray image, said image being created in response to said standard pulses.

4. A scanning X-ray microanalyser comprising a cathode-ray tube for producing scanned X-ray images in a first part of the screen of said cathode ray tube, means for producing a first group of standard pulses of predetermined counting rates which respectively differ in a stepwise manner, second means for creating a second group of standard pulses of a predetermined counting rate which varies continuously, and third means responsive to the first means for creating, in a second part of the screen of the said cathode-ray tube, a plurality of images, for comparison with the brightness of the scanned X-ray image, with standard brightnesses which respectively differ in a stepped manner, said images being created in response to said first group of standard pulses, said third means also creating in a third part of the screen of said cathode ray tube an image, for comparison with the brightness of the scanned X-ray image, with standard brightness which varies continuously, said third image being created in response to said second group of standard pulses.

References Cited by the Examiner

UNITED STATES PATENTS

| | | | |
|---|---|---|---|
| 2,408,487 | 10/1946 | Smith | 250—49.5 |
| 2,500,431 | 3/1950 | Potter | 179—1 |
| 2,700,741 | 1/1955 | Brown | 315—22 |
| 3,103,584 | 9/1963 | Shapiro | 250—49.5 |

RALPH G. NILSON, *Primary Examiner.*

HENRY S. MILLER, ANTHONY L. BIRCH,
*Assistant Examiners.*